United States Patent [19]

Israelson et al.

[11] Patent Number: 4,764,190
[45] Date of Patent: Aug. 16, 1988

[54] HIGH TEMPERATURE, HIGH PRESSURE GAS FILTER SYSTEM

[75] Inventors: Gordon A. Israelson; Thomas E. Lippert, both of Murrysville; Edward S. Olczak, Pittsburgh; David F. Ciliberti, Murrysville, all of Pa.

[73] Assignee: Westinghouse Electric Corp., Pittsburgh, Pa.

[21] Appl. No.: 13,300

[22] Filed: Feb. 10, 1987

[51] Int. Cl.[4] ............................................. B01D 46/00
[52] U.S. Cl. ...................................... 55/269; 55/302; 55/341 R; 55/465; 55/523; 55/341.1
[58] Field of Search .................................. 55/267-269, 55/302, 341 R, 341 NT, 341 HM, 523

[56] References Cited

U.S. PATENT DOCUMENTS

| Re. 24,954 | 3/1961 | Church | 183/61 |
|---|---|---|---|
| 2,980,207 | 4/1961 | Allen | 55/302 |
| 3,055,745 | 9/1962 | Drummond et al. | 23/288 |
| 3,073,097 | 1/1963 | Hallett et al. | 55/283 |
| 3,513,638 | 5/1970 | Young | 22/273 |
| 3,726,066 | 4/1973 | Colley | 55/302 |
| 4,158,554 | 6/1979 | Bundy et al. | 55/379 |
| 4,343,631 | 8/1982 | Ciliberti | 55/302 |
| 4,398,931 | 8/1983 | Shevlin | 55/341 |
| 4,610,283 | 9/1986 | Stoffler | 55/302 |
| 4,680,038 | 7/1987 | Titus | 55/302 |
| 4,692,176 | 9/1987 | Israelson | 55/302 |

FOREIGN PATENT DOCUMENTS 724927  2/1955  United Kingdom .

OTHER PUBLICATIONS

"Hot Hot Gas Cleaning Improves the Economics of Electricity-from-Coal"-G. P. Reed, Filtration & Separation-pp. 120-124.
"Comparison of High Temperature Gas Particulate Collectors for Low Level Radwaste Incinerator Volume Radwaste Incinerator Volume Reduction Systems", R. L. Moscardini et al.-Waste Management 83'.

Primary Examiner—Bernard Nozick
Attorney, Agent, or Firm—Michael G. Panian

[57] ABSTRACT

A filtering apparatus for separating particulates from high temperature, high pressure gas streams has a vessel divided into upper and lower chambers by a tubesheet, the tubesheet having a flexible support means with the rim thereof resting in a groove in outwardly extending flange portions securing together upper and lower sections of the vessel wall. The flexible support means for the tubesheet has a cylindrical wall depending from a support plate and a conical wall depending from the rim, the two walls secured together, with insulation between and about the walls. The vessel is insulated and preferably has a steam coil cooling device in the lower section thereof. A backflush system includes vertically spaced rows of pipes having tubes depending therefrom directed to the open tops of the filter elements, with the spaced rows connected together by pivotal links, and alignment means provided to align the open ends of the tubes with the open tops of the filter elements. The apparatus may use hollow, ceramic, tubular filter elements or hollow ceramic fabric filter elements.

19 Claims, 9 Drawing Sheets

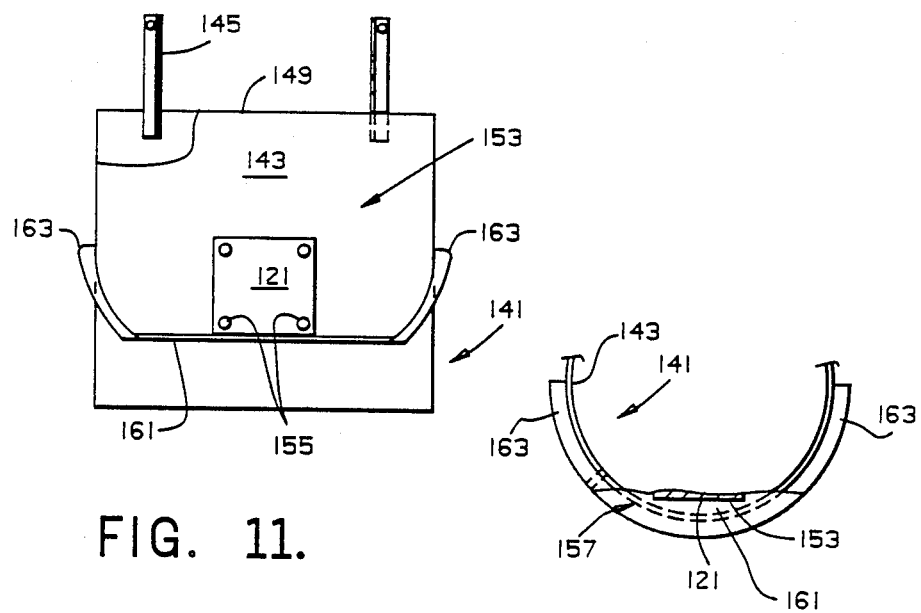
FIG. 11.
FIG. 12.
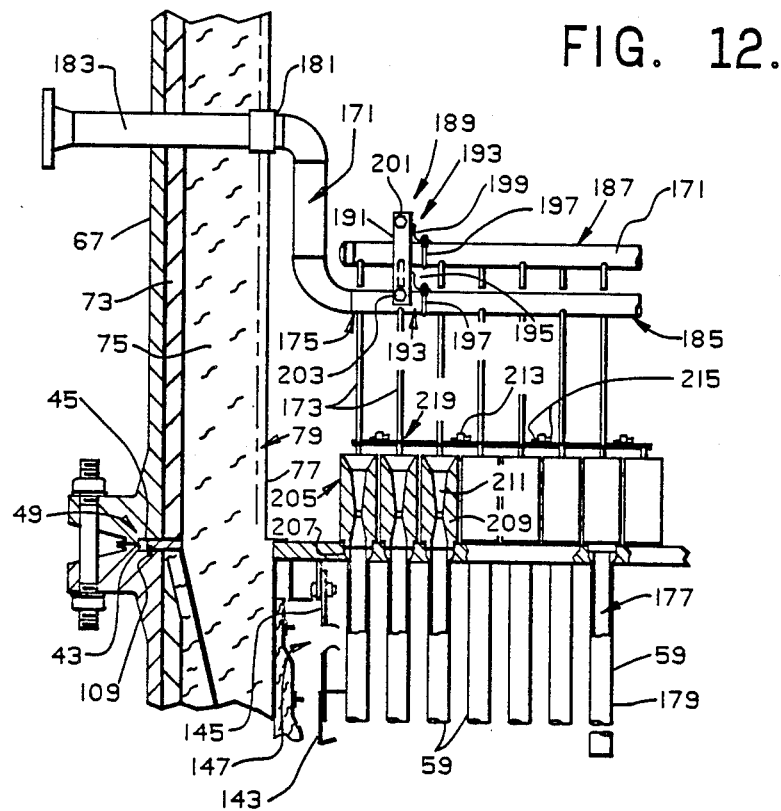
FIG. 13.

HIGH TEMPERATURE, HIGH PRESSURE GAS FILTER SYSTEM

CROSS REFERENCE TO RELATED APPLICATION

Reference is made to copending application Ser. No. 817,704 entitled "Apparatus and Process for Filtering High Temperature Gas Streams", filed Jan. 10, 1986 (W.E. 52,865) now abandoned in the names of G. Israelson, T. Lippert, J. Schwab and D. Ciliberti, which is assigned to the assignee of the present invention.

Reference is also made to copending application Ser. No. 932,115 entitled "Filter Unit for Use at High Temperatures", filed Nov. 18, 1986 (W.E. 52,939) in the names of D. Ciliberti and T. Lippert, which is assigned to the assignee of the present invention.

BACKGROUND OF THE INVENTION

Modern industrial methods have resulted in a need for an apparatus that is capable of effeciently filtering high temperature combustion gases containing particulate material. In combustion turbine application, for example, a combustion turbine extracts energy from hot combustion gases produced by burning natural or propane gas, petroleum distillates or low ash fuel oil. The limitation to not use coal or other solid fuels is that the particular carry over from combustion of such solid fuels turbine blade erosion and fouling. An efficient system for filtering of such hot combustion gases would permit the use of such solid fuels. As another example, in conventional boiler operations, the boilers undergo routine shutdown for cleaning the fireside surfaces and for inspection. An efficient hot gas filtering system would greatly extend the life and operational time for a boiler to operate between inspections. Fouling of the fireside surface due to ash deposition and corrosion would be eliminated or minimized. These oxidizing, high temperature and high pressure gases are difficult to filter using conventional techniques.

Removal of particulates from a hot combustion gas can prolong the life of turbine buckets in combustion turbine-generator systems and minimize fouling of heat exchange surfaces or boiler tubes in fossil fuel and cogeneration plants. Governmental regulations on permissible emissions due to public health considerations also add urgency to the effort to provide an efficient system for filtering such hot combustion gases. In recent years, a considerable amount of development effort has been expended developing an alternative to conventional cyclone separators for control of particulates in high temperature combustion gases. The new technology extends low temperature filtration experience developed for many years in conventional bag house filter systems.

Examples of the effects of assignee of the present invention in meeting the needs for filtering of hot gases are given in the aboveidentified related applications. In the Israelson et al. application, Ser. No. 817,704 now abandoned, an apparatus and process are described for use in filtering a hot, corrosive gas stream, such as a zirconium tetrachloride gas stream, to remove particulates therefrom without condensate or solids forming in the filtered gas due to cooling of the gas prior to exhaust from the filter system. While that filter apparatus uses a tubesheet to divide a filter vessel, or housing, into two chambers, with hollow, tubular filter elements suspended thereby, and uses a flexible support means to connect a support plate of the tubesheet to the wall of the housing, and is exceptionally suited to filtering gaseous streams of zirconium tetrachloride at temperatures in excess of about 450° C. (842° F.), the same would not effectively operate at higher temperatures of up to about 900° C. (1652° F.) and high pressures, due to the stresses applied to the tubesheet and support under such extreme operational conditions, In the Ciliberti et al. application Ser. No. 932,115, an apparatus for filtering of high temperature gases is described, and the problem of sealing a hollow, ceramic, tubular filter element to a tubesheet, at temperatures in the range of 700°–900° C. (1292°–1652° F.), discussed, with the use of a spiral ceramic spring made to bias the filter element to a tubesheet. As mentioned therein, metallic spring elements display a sharp drop in modulus of elasticity and become soft and yielding at temperatures in the range of 700°–900° C., and such temperatures also effect the properties of other metallic components of filtering systems.

It is an object of the present invention to provide a filtering apparatus that is usable to filter high temperature, high pressure, aggressive gases, such as oxidizing gases.

SUMMARY OF THE INVENTION

A filtering apparatus for separating particulate solids from high temperature, high pressure gas streams has a generally cylindrical vessel, the interior of which is divided into upper and lower chambers by a tubesheet which extends across the vessel, the tubesheet comprising a support plate and a peripheral flexible support means. The flexible support means has an outwardly extending support rim that rests in a support groove formed by a recess in at least one of first and second flange portions on top and bottom wall sections of the vessel. Hollow filter elements are suspended in apertures in the support plate of the tubesheet. Means for charging a hot gas stream to the lower chamber of the vessel and means for discharging filtered hot gases from the upper chamber of the vessel are provided, as its means for cleaning the filter elements by periodic reverse flow of a gas therethrough.

The flexible support means of the tubesheet preferably has a downwardly depending cylindrical wall on the periphery of the support plate and a downwardly depending truncated conical wall section on the support rim, the cylindrical and conical wall sections secured together at their bottom edges by a locking ring and welds. Thermal insulation is provided in a v-shaped hollow formed between the cylindrical and conical wall portions of the flexible support means as well as on other exposed surfaces thereof and along the inner surface of the vessel wall. The insulating means on the vessel wall is preferably a layer of cast insulation anchored to the inner surface of the vessel wall, a layer of ceramic fiber insulation adjacent thereto, and a stainless steel liner spaced from the ceramic fiber insulation forming an air gap therebetween.

The bottom wall section of the vessel is preferably formed from upper and lower subsections, with the lower subsection being of a conical cross-section, and a cooling means comprising a spiral steam coil is provided in the lower conical subsection, with means provided for passing steam therethrough to cool hot ashes therein.

A gas deflection plate is provided in spaced relation to the gas inlet to the lower chamber which may be mounted either by braces extending from the gas inlet or upon a shroud that surrounds the filter elements, the shroud depending from the tubesheet, with a gas entry space provided between the top of the shroud and the bottom of the tubesheet for passage of the hot gases through the space and downwardly through the shroud.

The backflush means provided to clean the filter elements comprises backflush pipes attached to the wall of the vessel in the upper chamber, with vertically spaced rows of backflush pipes attached to opposite sides of the vessel and connected together by pivotally mounted support links. The backflush pipes have vertically disposed tubes connected thereto through which the backflush gas is directed to the open tops of the filter element, with alignment means provided to align the discharge ends of the tubes with the open tops of the filter elements.

DESCRIPTION OF THE DRAWINGS

In the Drawings:

FIG. 11 is an elevational view of a shroud used to surround the filter elements in an embodiment of the present invention, with the gas deflector plate secured to the shroud;

FIG. 12 is a view looking down on the shroud illustrated in FIG. 11 illustrating the lip and deflecting ramps thereon;

FIG. 13 is a view, partly in cross section of the placement of the backflush pipes in alignment with hollow, ceramic, tubular filter elements, showing the support thereof and pivoted connection therebetween;

DETAILED DESCRIPTION

Figure 1:
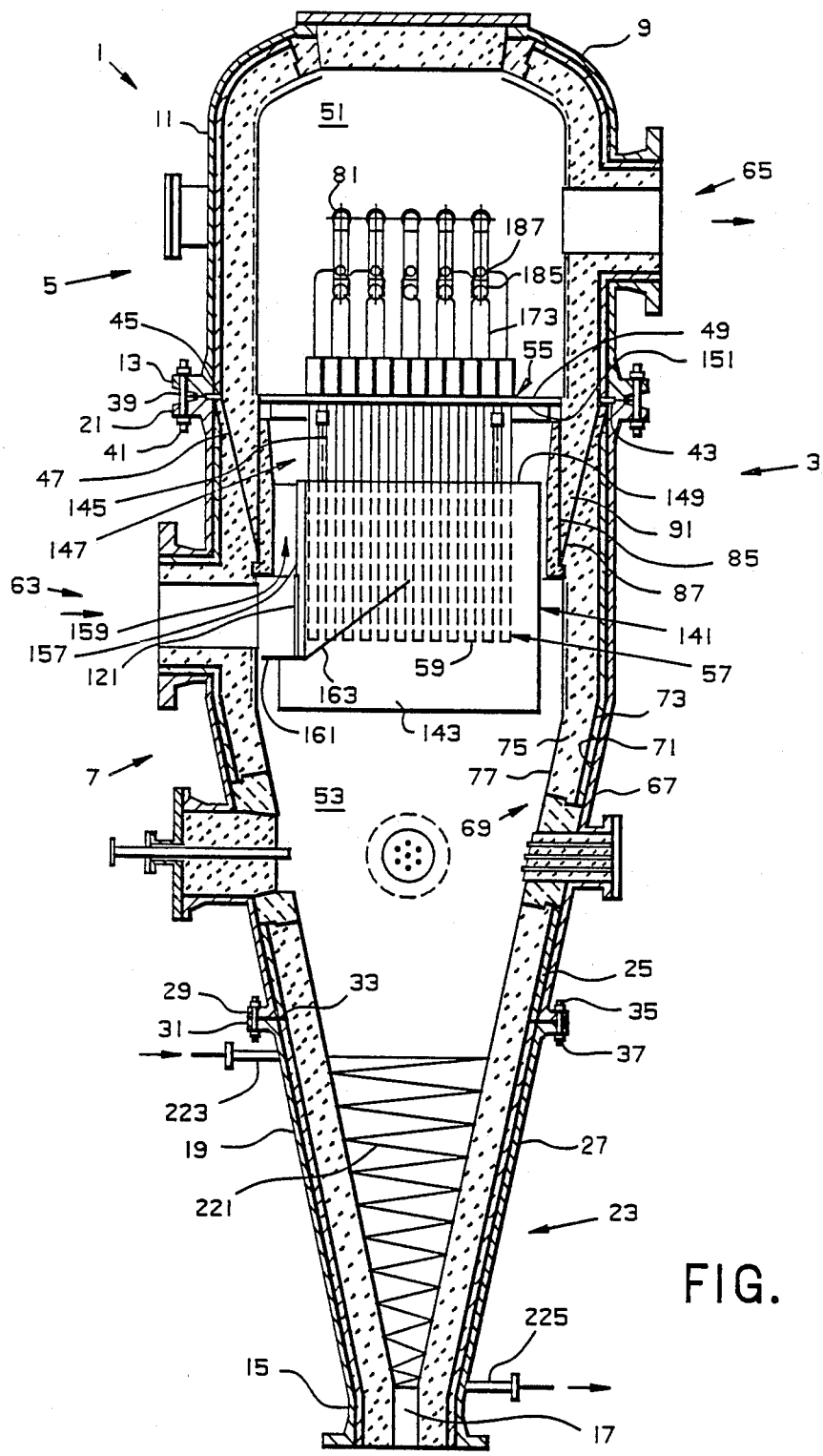
FIG. 1 is a vertical cross-section of a filtering apparatus using hollow, cermic, tubular filter elements according to an embodiment of the present invention.

Referring now to FIG. 1, a filtering apparatus 1 according to the present invention comprises a vessel 3 of generally circular cross-section which has a top wall section 5 and bottom wall section 7. The top wall section 5 has a closed upper or top wall 9 and a peripheral side wall 11 extending downwardly from the top wall 9, which side wall 11 terminates as a first outwardly extending flange portion 13. The bottom wall section 7 has a bottom wall 15 that has a solids outlet 17 therein at the lowest region thereof, and a peripheral side wall 19 extending upwardly from the solids outlet 17, which side wall 19 terminates as a second outwardly extending flange portion 21. The lower section 23 of the peripheral side wall 19 is preferably of a conical cross-section with the side wall converging to the location of the solids outlet 17. The solids outlet 17 is closed by a solids removal device, such as a lock hopper or a screw conveyor, or the like (not shown). In a preferred embodiment, the side wall 19 of the bottom wall section 7 can be formed from upper and lower sub-sections 25 and 27 respectively, which sub-sections are welded together at confronting outwardly extending flanges 29 and 31, as at 33, as well as bolted together by bolts 35 and nuts 37 securing the flanges 29 and 31 together.

Figure 2:
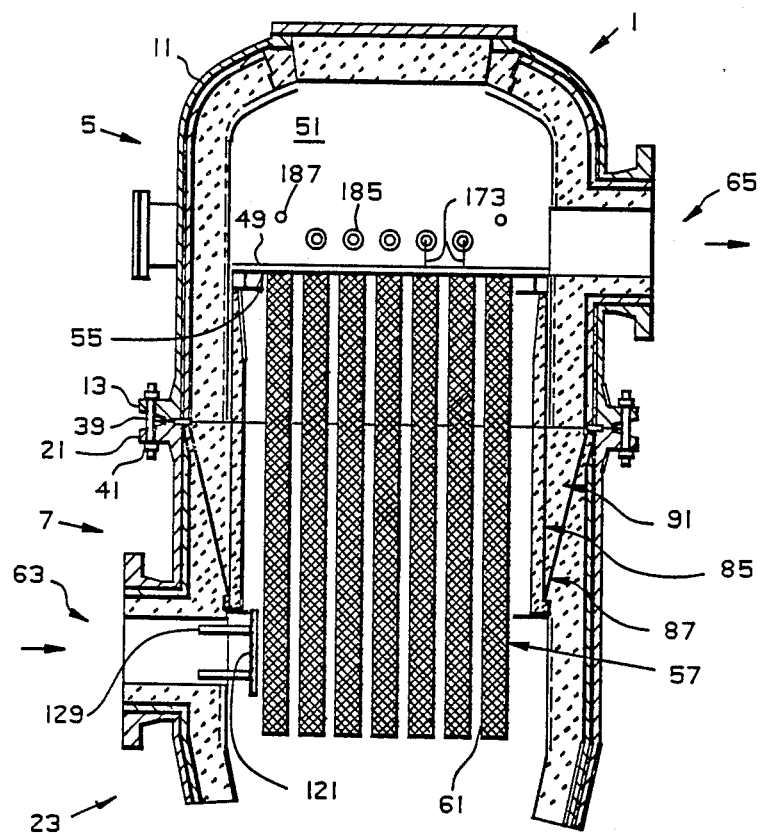
FIG. 2 is a vertical cross-section of the upper portion of a filtering apparatus using hollow, ceramic fabric bag filter elements according to another embodiment of the present invention.
Figure 7:
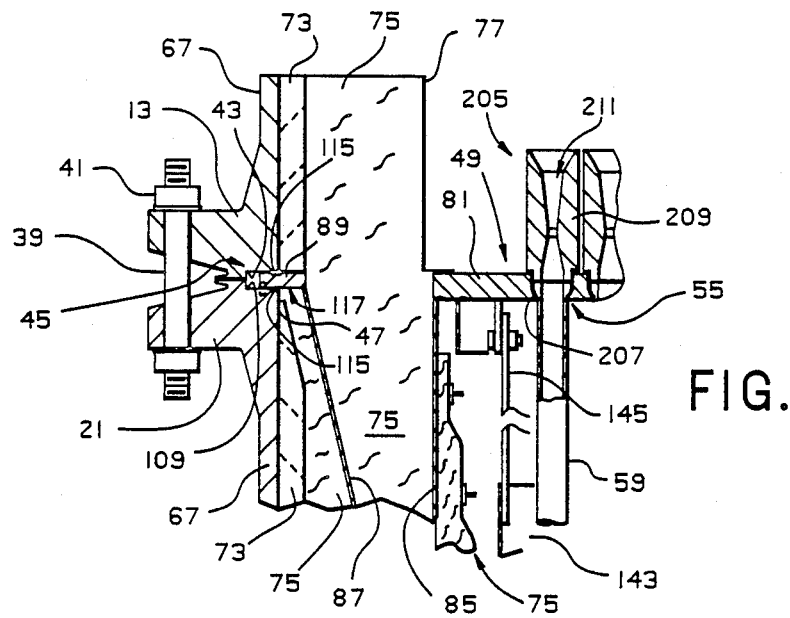
FIG. 7 is an enlarged sectional view of the outwardly extending flange portions of the vessel top and bottom wall section showing the securement means therefor and the groove in which the rim of the flexible support means of the tubesheet is disposed.

The top wall section 5 and bottom wall section 7 are releasably secured together at first and second flange portions 13 and 21 by the use of bolts 39 and nuts 41, and with seal welding of lip portions of the flanges together to prevent gas leakage. At least one of the flange portions 13 and 21, and preferably both, has a recess 43, about the inner region thereof which forms a support groove 45 about the inner wall 47 of the vessel 3 for support of a tubesheet, as best shown in FIG. 7. The groove 45 about the inner surface 47 extends into the flanged portions 13 and 21 a distance that will accept the tubesheet support rim. A tube sheet 49 extends across the interior of the vessel 3 and divides the vessel interior into upper chambers 51 and lower chambers 53, the tube sheet 49 having a plurality of apertures 55 therein in which a plurality of filter elements 57 are disposed. The filter elements 57 may be hollow, ceramic, tubular filter elements 59 as shown in FIG. 1, or tubular fabric bag filter elements 61 as shown in FIG. 2. A means for charging a particulate-containing hot gas stream, such as inlet 63 is provided on bottom wall section 7 to charge the same into the lower chamber 53 of the vessel 3, while a means for discharging filtered gas from the upper chamber 51, such as outlet 65 is provided in the top wall section 5 of the vessel 3.

Figure 3:
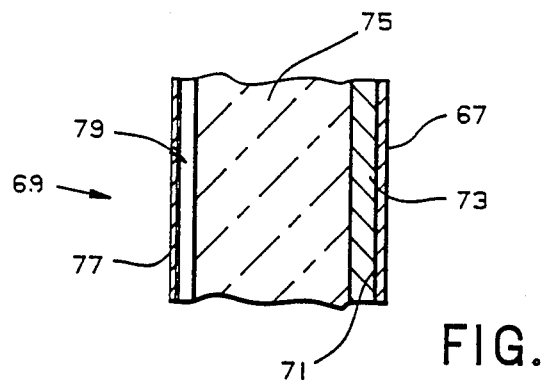
FIG. 3 is a cross-section taken through a portion of the wall of the filter vessel illustrating the insulation means provided on the inner wall thereof.

The vessel comprises a steel casing 67 with insulating means 69 about the inner surface 71 thereof. The insulating means 69 (FIG. 3) preferably is composed of a three layer system. The insulating layer adjacent the inner surface 71 of the casing 67 is preferably a cast refractory insulation 73 anchored to the steel casing by anchors (not shown). A second layer of insulation comprises a ceramic fiber batt type insulation 75 which is adjacent the cast refractory insulation 73. An innermost liner 77, preferably of stainles steel, attached to the casing 67 by anchors (not shown), is then provided adjacent to, and spaced from the ceramic fiber batt insulation 75 to form a gap 79, or air space, therebetween. As the gas temperature in the vessel 3 increases, the liner 77 also heats up and grows due to the thermal expansion. The gap 79 is shortened by the growth of the liner 77, but the ceramic fiber insulation is not compressed thereby, which would cause a loss of insulation efficiency.

Figure 4:
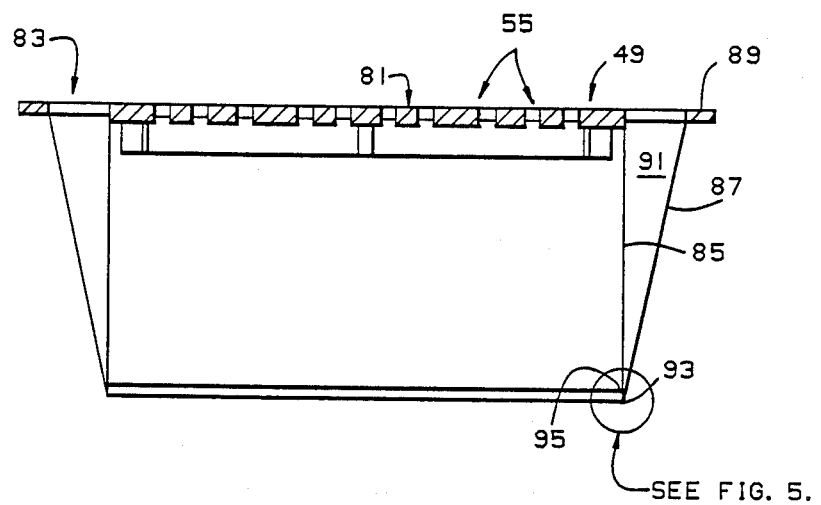
FIG. 4 is a vertical cross-section of a tubesheet and flexible supporting means therefor adapted for use with hollow, ceramic, tubular filter elements in the filtering apparatus of the present invention.
Figure 5:
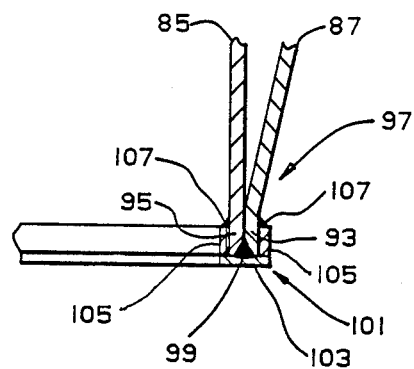
FIG. 5 is a view of the area within the circle 5 shown in FIG. 4, illustrating the securement of the bottom of the cylindrical wall section and conical wall section of the flexible support means for the tubesheet.
Figure 6:
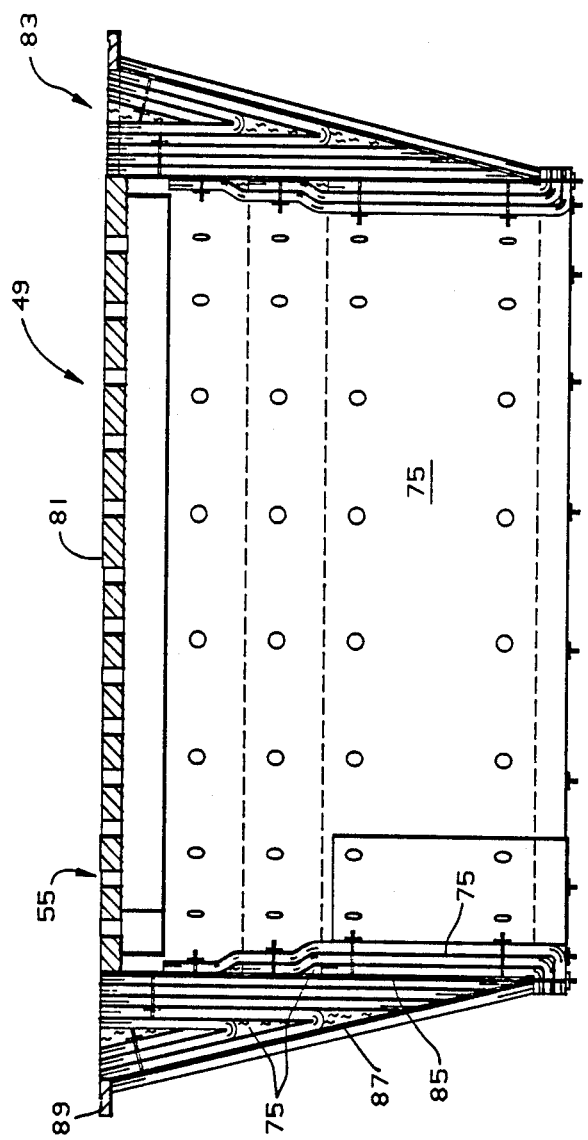
FIG. 6 is a view simlar to FIG. 4 showing the insulation for the flexible support means.

The tube sheet 49 for use where hollow, ceramic, tubular filter elements 59 are used to filter the high temperature, high pressure gases is illustrated in FIGS. 4 to 6. The tubesheet 49, has a support plate 81 with a plurality of apertures 55 therethrough for securement of hollow, tubular, ceramic filter elements 59 therein. The support plate 81 has about the periphery thereof a flexible support means 83, formed from a cylindrical wall section 85 which depends from the periphery of the support plate 81, and a truncated conical wall section 87 which depends from a support rim 89. The conical wall section 87 and cylindrical wall section 85 form a v-shaped hollow 91 therebetween, and are secured together at their bottom edges 93, 95 respectively. At the intersection of the bottom edges 93 and 95 of the conical wall section 87 and cylindrical wall section 85, a securement means, or joint 97 is provided which comprises a weld 99 and also a locking ring 101 which mechanically locks the ends together. The locking ring has a bottom wall 103 and pair of upwardly disposed rims 105, with the upper edges of the rim also welded to the respective wall section as at 107. This joint area is a critical, high stress area. The mechanical locking effected by the locking ring 101, and strengthening function served thereby prevents failure of the joint 97.

The tubesheet 49 is centered in the vessel, and the support rim 89 is retained within the groove 45, about the inner wall 47 of the vessel 3, and rests on the lower wall 109 thereof (FIG. 7). The flanged portions are clamped together by use of bolts 39 and nuts 41 to seal the same. The rim 89 is compressed between two spiral wound stainless steel gaskets 115, one of each of which is situated between the rim 89 and each flanged portion 13 and 21. Insulation 73 and 75 are provided both above and below the portion 117 of the rim 89 exposed to the interior of the vessel and insulation 75 is provided which surrounds the flexible means 83, being on both sides of cylindrical wall section 85 and conical wall section 87, and filling the v-shaped hollow 91.

A gas deflection plate 121 to prevent direct impingement of an entering gas stream on the filter elements is provided for use in connection with the various embodiments of the present invention, wherein mounting of the plate 121 in a position spaced from gas inlet 63 to the lower chamber 53 of the vessel 3 may vary.

Figure 8:
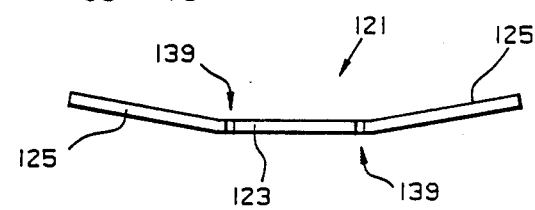
FIG. 8 is a top view of a gas deflection plate usable in the present invention.
Figures 9, 10:
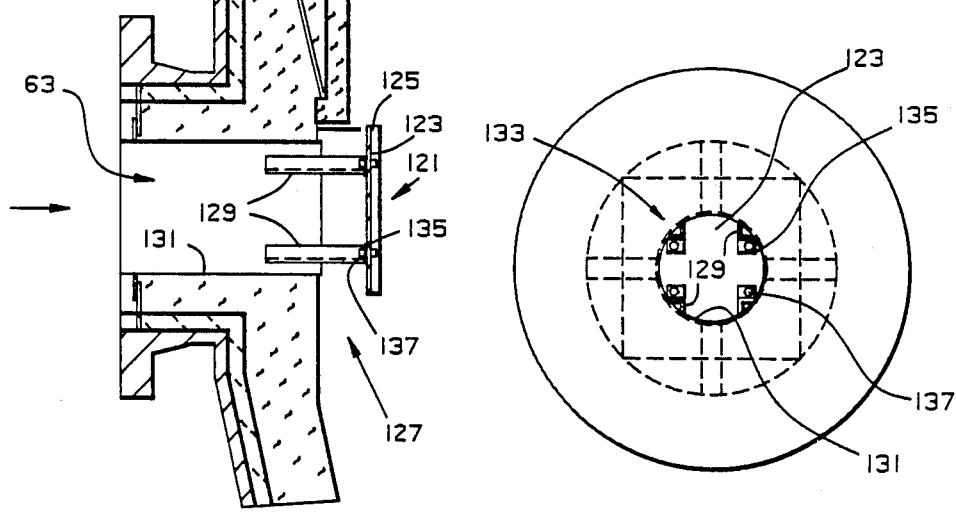
FIG. 9 is a cross-sectional view of the gas inlet and securement to the inner wall thereof of the gas deflector plate in spaced relation thereto.
FIG. 10 is a view looking through the gas inlet towards the gas deflector plate secured as in the embodiment shown in FIG. 9.

One method of mounting the deflection plate 121, which preferably has a flat segment 123 and a pair of angularly rearwardly extending segments 125 (FIG. 8), is to mount the same by mounting means 127 such as a plurality of angle-iron braces 129 which are welded to the inner wall 131 of the gas inlet 63, as at 133, and extend parallel to the axis of the gas inlet. The braces extend from the gas inlet 63 a predetermined distance and have arms 135 at the exposed terminus thereof, with bolts 137, passing through apertures 139 through segment 123, or other securement means fixing the flat segment 123 of the gas deflection plate 121 to the arms 133, as illustrated in FIGS. 9 and 10. Such mounting is especially preferred where hollow, ceramic fabric filters 61 are used in the filtering apparatus, as illustrated in FIG. 2, but may also be used where hollow, ceramic, tubular filter elements 59 are present.

An alternate method of mounting the deflector plate 121, as illustrated in FIGS. 11 and 12, is specifically adapted for use in connection with hollow, ceramic, tubular filter elements, where a protective shroud 141 is also provided to protect the filter elements and direct the gas flow along a designated flow path. The shroud 141 comprises a vertically extending cylindrical flue 143, having vertically extending bars 145 securing the flue 143 to the tubesheet 49, the flue 143 surrounding the filter elements 59, with a gas entry space 147 between the top 149 of the flue 143 and the bottom 151 of the tubesheet 49. The protective shroud 141 is designed to force incoming gas, to chamber 53, to flow upwardly over the top of the flue 143 through the space 147 and thence downwardly through the flue 143. In this embodiment, the gas deflector plate 121 may be mounted on the outer surface 153 of the flue 143 facing the gas inlet 63 and secured thereto by use of bolts 155. The front section 157 of the flue is flattened so as to form a chimney-type opening 159 between the inner wall of the vessel and the flue 143. A forwardly extending lip 161 and curvilinear, upwardly inclined deflecting ramps 163 on either side of lip 161, the lip adjacently below the gas inlet 63, direct the gas to flow upwardly through the chimney-type opening 159 and over the top 149 of the flue 143 through the space 147. The gas will have less resistance to flow by moving up instead of down. The deflecting ramps 163 and lip 161 have a small clearance with the inner liner of the vessel 3 which restricts the flow of gas which will pass downwardly and enter the filter elements from below the flue 143. With the bulk of the gas flow forced over the to 149 of the flue 143, the re-intrainment of particles into the gas is minimized during the backflush cleaning of the filter elements 59.

The filter elements 57 are cleaned by use of a backflush manifold assembly that directs a blast of gas into the hollow, filter elements in a direction opposite the flow of hot gases for filtering. As in prior filtering units, instrumentation is used to measure the differential pressure across the tubesheet 49, between chambers 51 and 53. When the filtered particulates form a thick cake on the filter elements 57, a predetermined high differential pressure set point is attained.

Figure 14:
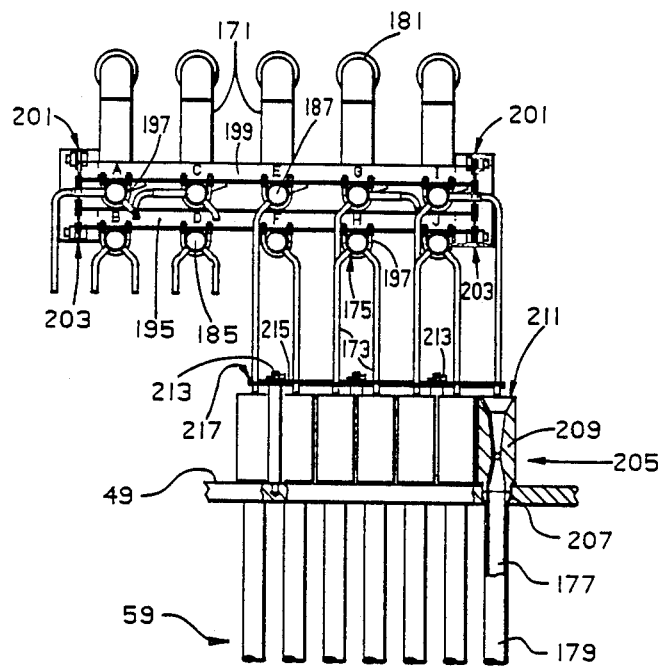
FIG. 14 is a view taken transverse to the view shown in FIG. 13 illustrating the backflush pipe support and alignment of vertical tubes with the open ends of hollow, ceramic tubular filter elements.

External valves, not shown, one for each backflush pipe 171 (FIGS. 13 and 14) are actuated in sequence, the backflush pipes adapted for connection to a source of pressurized gas (not shown). As each valve opens, high pressure gas is permitted to enter that backflush pipe. The pulse of gas exits its pipe 171 through numerous small diameter tubes 173 that connect with orifices 175 in the pipe. The gas is directed down the filter element inner hollow section 177 in the reverse direction, blowing the filter cake off the outside wall 179 of the filter element 59. Each backflush pipe 171 is connected by a socket weld 181 to a pipe extension 183 which penetrates through the wall of the vessel 3 and is connected to a source of pressurized gas (not shown). This socket weld arrangement permits removal of a backflush pipe 171, redressing of the weld prepartion and installation of a substitute backflush pipe when desired. In this manner, the same pipe extensions 183, external piping and valves do not need to be disturbed when making repairs. Half of the backflush pipes 171, indicated as 185 in FIGS. 13 and 14, are anchored on one side of the vessel 3, and half 187, on the other side. The pipes 185 from one side of the vessel 3 enter the chamber 51 at a different elevation than those pipes 187 on the other side. This enables connection of one elevation group of pipes 185 to the other elevation group of pipes 187 by pivotal connection means 189, such as rotating vertical links 191. Each of the backflush pipes at one elevation, 185 or 187, is connected to all other pipes at that elevation by rods 193 which extend laterally across the pipes. The supporting structural rods 193, designated 195, to which backflush pipes 185 are secured by U-shaped clamps 197, are connected to the supporting structural rods 193, designated 199, to which backflush pipes 187 are secured by U-shaped clamps 197, by the vertical link 191. This arrangement creates a rigid bridge-like structure which spreads the reaction force of one backflush pipe 171 over all of the pipes. The vertical links 191 have pivotal connections 201 and 203 to rods 195 and 199 respectively and the links 191 are designed to rotate about these pivotal connections.

The rotating vertical links 191 are of a length which compensates for the thermal growth of each group of pipes 185, 187. At room temperature, the links 191 are vertical. At operating temperature, the upper group of backflush pipes 187 have grown in the opposite direction to those of the lower group of backflush pipes 185 causing a horizontal misalignment of the pivotal connection parts 201 and 203. The length of the link 191 is chosen to grow thermally, sufficient to rotate and maintain the correct vertical spacing between the series of backflush pipes 185 and 187.

Each backflush pipe 171 supplies a plurality of small vertical tubes 173, with each small vertical tube 173 providing the backflush pulse that cleans an individual filter element 57. With the use of hollow, ceramic, tubular filter elements 59, it is preferred to use a venturi weight 205 to hold down and seal each individual hollow, ceramic, tubular filter element to the tubesheet 49. The venturi weight 205 is sufficiently heavy to prevent the filter elment from rising off of a gasket 207 provided between the filter element 59 and the tubesheet 49, and losing the dust seal, due to the net upward force of the differential pressure across the tubesheet 49. The venturi weight 205 which is a cylindrical block 209 having a venturi passage 211 therethrough has a secondary function which is the enhancement of the backflush gas pulse. When hollow, ceramic, tubular filter elements are being cleaned by a pulse of high pressure gas from vertical tubes 173, the venturi passage 211 acts like an eductor. The gas pulse pulls additional gas from the immediate vicinity and increases the total volume of backflush gas which improves the cleaning effect. The venturi weights 205 are sized to also act as pressure relief valves to protect against over-pressure stresses in the tubesheet 49. When over-pressure conditions occur, the venturi weights 205 and filter elements pop up, releasing the seal and relieving the pressure.

Figure 15:
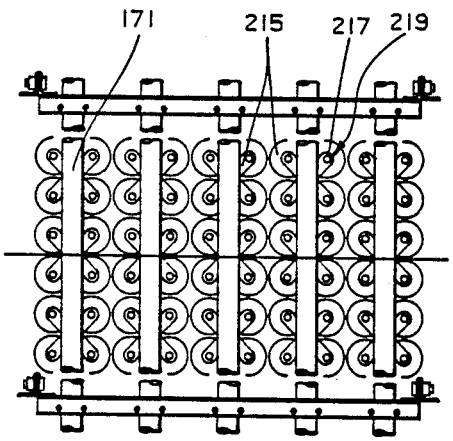
FIG. 15 is a plan view showing the alignment means for the vertical tubes.

The correct alignment of the vertical tubes 173 over the center of a respective hollow, ceramic tubular filter element is important. The effectiveness of the reversed flow pulse in cleaning the filter elements is greatly reduced when the pulse is introduced off center. The means for aligning the vertical tubes 173 over the ceramic filter elements includes a support post 213 attached to the tubesheet 49 at its lower end. At the upper end of the support post 213 are attached a cross of two perpendicular arms 215 (FIG. 15) which have apertures 217 adjacent the ends 219 thereof. The vertical tubes 173 extend downwardly from the backflush pipes 171, through the apertures 217 in the arms 215 attached to the support posts 213. When the system is at the high operating temperatures, the tubesheet 49 and backflush pipes 171 have grown thermally in different directions. The bottoms of the vertical tubes 173 are held in aligned position over the opening of the filter element by the support posts 213 and arms 215 which follow the tubesheet thermal growth.

The vertical tubes 173 are as long as possible, subject to space constraints, to give them maximum flexibility and enable the same to bend without overstressing the backflush pipes 171 above, or the tubesheet 49 below. For each backflush pipe 171, the backflush pattern of the vertical tubes 173 is staggered on either side of the pipe axis to minimize torsional moments and stress in the pipe.

Figures 16, 17:
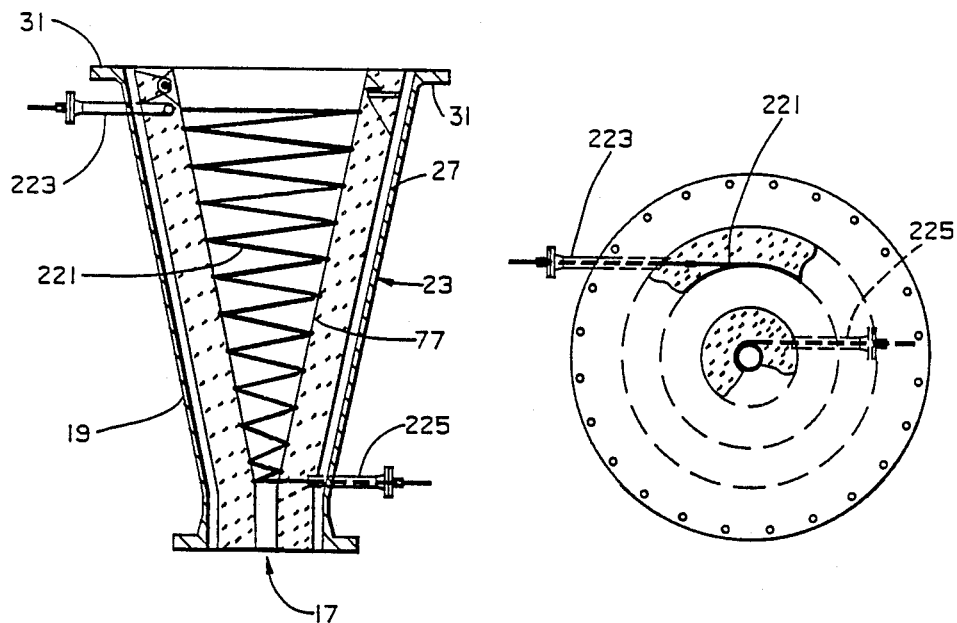
FIG. 16 is a vertical view, partly in cross-section showing the steam coil cooling means usable in the bottom wall section of the vessel.
FIG. 17 is a top view of the steam coil cooling means shown in FIG. 16.
Figure 18:
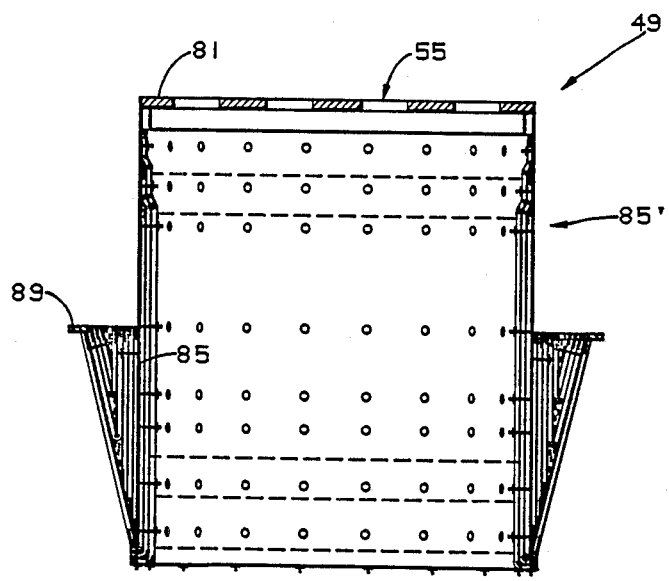
FIG. 18 is a vertical cross-section of a tubesheet and flexible support means therefor adapted for use with hollow, ceramic fiber bag filter elements showing the insulation thereon.
Figure 19:
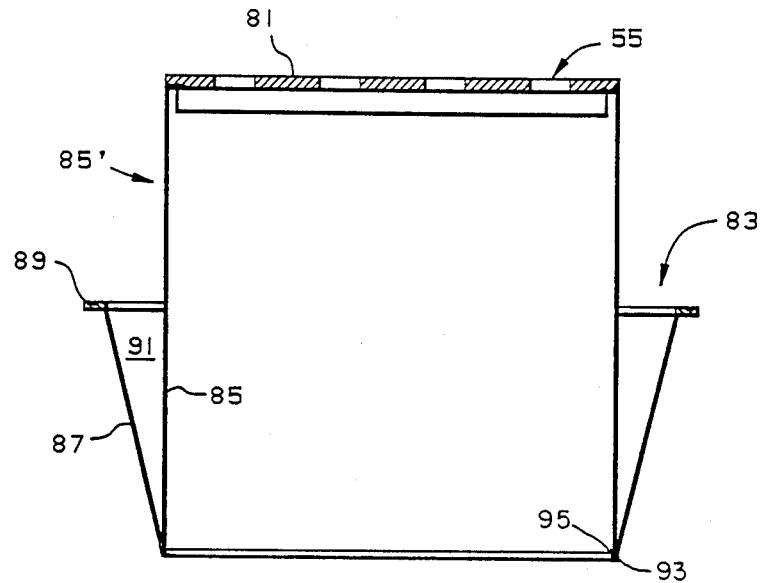
FIG. 19 is a view similar to FIG. 18 with the insulation removal.
Figure 20:
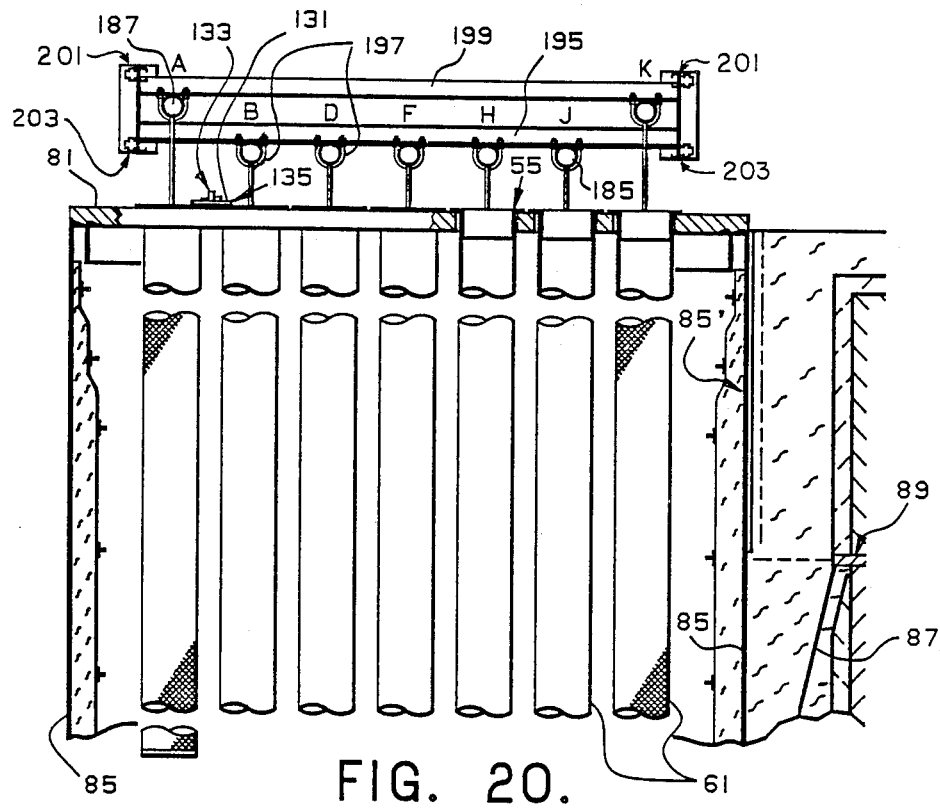
FIG. 20 is a vertical view, in partial cross-section illustrating the backflush means for the hollow, ceramic fabric bag filter elements.

Another feature of the present filtering apparatus is the provision of a cooling means for hot ash and particulates carried by the high temperature gas stream into the chamber 53 of vessel 3. As illustrated in FIGS. 1, 16 and 17, the lower section 23 of the peripheral side wall 19 has a conical cross-section converging to the location of the solids outlet 17. A steam coil 221, in the form of a spiral, is attached to the stainless steel liner 77, with an inlet 223 to the coil provided through the wall of the vessel 3 at one end of the steam coil 221, and an outlet 225 at the other end thereof. The steam coil serves two purposes. One purpose is to provide some preheat to the interior of the vessel 3 prior to startup. The other purpose is to cool the hot ash that collects in the bottom of the vessel 3 during operation prior to discharge therefrom through solids outlet 17. Cooling of the hot ash minimizes the problem of fires developing in an ash hopper (not shown) due to uncombusted carbon products collected with the ash.

A modification of the tubesheet 49 is employed in connection with the use of hollow, ceramic fabric filters, wherein the support rim 89 of the flexible support means 83 is situated below the support plate 81 of the tubesheet 49. As illustrated in FIGS. 2 and 18 to 20, a tubesheeet 49 has a support plate 81 with a plurality of apertures 55 therethrough for securement of a plurality of hollow, ceramic fabric bag-type filter elements 61. About the periphery of the support plate 81 there is a flexible support means 83, which comprises a cylindrical wall section 85 depending from the periphery of the support plate 81, and a truncated conical wall section 87 which depends from an outwardly extending support rim 89. The conical wall section 87 and cylindrical wall section 85, as hereinbefore described in the description of FIG. 5, are sealed at joint 97 by welds 99 and 107 and locking ring 101. In this embodiment however, the support plate 81 is disposed at a raised elevation relative to the support rim 89 by means of an extension 85' of the cylindrical wall section 85. The hollow, ceramic fabric bag filters 61 are retained in the apertures 55 of the support plate 81 by the use of a clamp plate 131 which is secured to the tubesheet support plate 81 by means of a securement fixture 133 that is tack welded as at 135 to the support plate, only one such clamp plate being shown in FIG. 20, to hold the ceramic filter bag filters in sealed relationship to the tubesheet against the differential pressure force. The clamp plate 131 is tack welded to ensure easy assembly and disassembly operations by eliminating the problems of galling of threaded parts. The backflushing of the hollow, ceramic fabric bag filters is effected as with the hollow, tubular, ceramic filter elements, except that the venturi weights 205 are not present, and the use of support posts 213, and perpendicular arms 215 with apertures 217, may be unnecessary.

The following is a general description of the dimensions and specification of an apparatus of the present invention, for filtering of an oxidizing gas stream under normal conditions of 810° C. (1490° F.) inlet gas temperature and 10.5 bar (152 psig) pressure and a maximum condition of 900° C. (1652° F. and 12 bar (174 psig). The carbon steel vessel would be about 38 mm (1.50") thick, with an inner diameter of about 2480 mm (97.99"). The total length of the vessel 3 would be 8821 mm (347.28"), with the upper section 5 being about 2295 mm (90.35") and the lower section 7 about 6526 mm (256.9"). The bottom section would be divided into two subsections, subsection 23 being 2650 mm (104.33") and the subsection 25 being 3876 mm (152.6"). The support plate 81 of the tubesheet would be about 1892 mm (74.50") in diameter, while the diameter, to the ends of the rim of the flexible support means would be 2565.4 mm (101"). The rim would thus extend into the groove 43 in the inner wall about 38.2 mm (1.50") completely about the inner wall of the vessel. The tubesheet is centered in the vessel by the flexible support means which permits it to thermally expand. For example, a 1905 mm (75") tubesheet will grow about 25.4 mm (1") in diameter when its temperature is raised from 21° C. (70° F.) to 899° C. (1650° F.). The vessel wall, if about 2540 mm (100") in diameter, will grow about 5.1 mm (0.2") when its temperature is increased from 21° C. (70° F.) to 121° C. (250° F.). The flexible tubesheet support permits the tubesheet to grow with respect to the vessel wall and stay centered in the vessel. The tubesheet flexible support means is thermally insulated to produce a thermal gradient through the depth of the insulation.

The portions of the flexible tubesheet support which are furthest from the hot gases are the coolest and have the greatest strength. The layering of insulation and structure is designed to produce the required strength of materials in the tubesheet support means to bear the stresses due to thermal growth of the tubesheet with respect to the rim that is captured at the vessel flanged closure.

The rim of the flexible support means is compressed between two spiral wound stainless steel gaskets at the flanged portion of the vessel. The vessel flanged portion and the rim rise in temperature together so there is little or no differential thermal growth tending to cause the rim to slide with respect to either gasket. The motion of the rim with respect to the gasket, due to temperature elevation, is a rotation of the inner part of the rim downwardly and the outer part of the rim upwardly. The gaskets are adapted to provide sufficient flexibility and springback to accommodate this rotational motion.

The vessel would have on the inner wall an insulating means comprising a 51 mm (2") thick cast refractory layer closest to the vessel, a second layer of ceramic filter insulating batts 203 mm (8") thick, and an innermost liner of stainless steel 3 mm (⅛")thick. An air gap is present between the liner and the ceramic fiber insulating batts. With use of such an insulating means the exterior of the vessel would be at a temperature of about 90°–150° C. (194°–302° F.) when it filters a hot gaseous stream at a temperature of about 810°–900° C. (1490°–1652° F.).

The present high temperature, high pressure filtering apparatus thus removes particulates from aggressive gas streams which cannot be filtered by conventional filtering equipment.

What is claimed is:

1. A filtering apparatus for the separation of particulates from a high temperature gas stream comprising:
    a generally circular vessel having a top wall section, comprising a closed upper wall and a peripheral side wall extending downwardly therefrom, said side wall terminating in a first outwardly extending flange portion;
    a bottom wall section, comprising a bottom wall having a solids outlet thereon, and a peripheral side wall terminating in a second outwardly extending flange portion;
    at least one of said first and second outwardly extending flange portions having a recess about the inner region thereof forming a support groove about the inner wall of the vessel;
    a tubesheet extending across said vessel dividing the same into upper and lower chambers having a support plate with a plurality of apertures therethrough;
    said tubesheet having a flexible support means about the periphery thereof which terminates in an outwardly extending support rim, said flexible support means comprising a cylindrical wall section depending from the periphery of the support plate of said tubesheet and truncated conical wall section depending from said support rim, said cylindrical section and conical section forming a v-shaped hollow therebetween and being secured together by securement means at a location below said support plate;
    the outwardly extending support rim of said flexible support means resting within said support groove;
    hollow filter elements having open tops disposed in the apertures of said support plate extending into said lower chamber;
    means for charging a hot gas stream containing particulates into the lower chamber of said vessel;
    means for discharging a filtered hot gas stream from the upper chamber of said vessel; and
    means for cleaning said filter elements by reverse flow of a gas therethrough.

2. The filtering apparatus as defined in claim 1 wherein the securement means securing the conical wall section and cylindrical wall section together includes a locking ring having a bottom wall and pair of upwardly disposed rims, the upper edges of said rims welded to the respective wall section.

3. The filtering apparatus as defined in claim 1 wherein insulating means are provided about the inner surface of said vessel, within said v-shaped hollow, and on said cylindrical wall section and truncated conical wall section.

4. The filtering apparatus as defined in claim 3 wherein the insulating means about the inner surface of said vessel comprises a first layer of refractory material, a second layer of ceramic fiber material, and a third layer of stainless steel, said third layer disposed in spaced relation to said second layer.

5. The filtering apparatus as defined in claim 1 wherein said bottom wall section is of conical cross-section, with the side wall converging to the location of said solids outlet.

6. The filtering apparatus as defined in claim 5 wherein said bottom wall section is formed from upper and lower subsections, said subsections having confronting outwardly extending flanges, and said flanges are secured together.

7. The filtering apparatus as defined in claim 6 including a spiral steam coil disposed in said lower subsection for cooling of hot solids present in said subsection, and a steam inlet means to said coil and steam outlet means from said coil for passage of steam therethrough.

8. The filtering apparatus as defined in claim 1 wherein said means for charging a hot gas containing particulates into the lower chamber of said vessel in a gas inlet and a gas deflection plate is disposed within said vessel, spaced from said gas inlet, to prevent direct impingement of the entering gas stream on said filter elements.

9. The filtering apparatus as defined in claim 8 wherein said gas inlet has an inner wall and said gas deflection plate is supported in said spaced relation to said gas inlet by securement to angle-iron braces welded to said inner wall of the gas inlet, the braces extending from the gas inlet a predetermined distance.

10. The filtering apparatus as defined in claim 8 wherein a shroud, comprising a vertically extending cylindrical flue, surrounds said filter elements in said lower chamber, said cylindrical flue secured to the tubesheet by vertically extending bars with a gas entry space provided between the top of the flue and the bottom of the tubesheet, and said gas deflection plate is mounted on the outer surface of said flue.

11. The filtering apparatus as defined in claim 10 wherein the front section of said cylindrical flue facing said gas inlet is a flattened surface to form a chimney-type opening between the inner wall of the vessel and the flue, and the gas deflection plate is mounted on said flattened surface.

12. The filtering apparatus as defined in claim 11 wherin a forwardly extending lip is provided on said flattened surface of the flue adjacently below said gas inlet, and curvilinear, upwardly deflecting ramps are provided on said flue on either side of said lip.

13. The filtering apparatus as defined in claim 12 wherein said filter elements comprise hollow, ceramic, tubular filter elements.

14. The filtering apparatus as defined in claim 1 wherein said means for cleaining said filter elements comprises a plurality of backflush pipes adapted for connection to a source of pressurized gas, and a plurality of vertical tubes communicating with said backflush pipes and terminating adjacent the open ends of the hollow filter elements, with one said tube provided for each said hollow filter element.

15. The filtering apparatus as defined in claim 14 wherein two vertically spaced rows of backflush pipes are provided, one anchored to one side of the vessel and the other anchored to the opposite side of the vessel, and means are provided for pivoted connection together of said two rows of backflush pipes.

16. The filtering apparatus as defined in claim 15 wherein said means for pivoted connection comprises at least one supporting structural rod secured to each of said rows of backflush pipes and vertical links, having pivotal connections to said rods, extending between said supporting structural rods.

17. The filtering apparatus as defined in claim 16 wherein said vertical tubes are aligned above said open tops of the filter elements by a support post attached to said tubesheet and arms with apertures therethrough attached to said support posts, with the lower end of said vertical tubes extending through said apertures in vertical alignment with the open tops of the filter elements.

18. The filtering apparatus as defined in claim 1 wherein the support rim of said flexible support means is situated below the support plate of the tubesheet.

19. The filtering apparatus as defined in claim 18 wherein said filter elements comprise hollow, ceramic fabric bag filter elements.

* * * * *